(12) United States Patent
Tanaka

(10) Patent No.: US 7,283,191 B2
(45) Date of Patent: Oct. 16, 2007

(54) LIQUID CRYSTAL DISPLAY DEVICE AND ELECTRONIC APPARATUS WHEREIN LIQUID CRYSTAL MOLECULES HAVING PARTICULAR PRE-TILT ANGLE

(75) Inventor: Takaaki Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 283 days.

(21) Appl. No.: 10/977,196

(22) Filed: Nov. 1, 2004

(65) Prior Publication Data

US 2005/0146665 A1 Jul. 7, 2005

(30) Foreign Application Priority Data

Nov. 19, 2003 (JP) ............................. 2003-389291
Jul. 21, 2004 (JP) ............................. 2004-212603

(51) Int. Cl.
*G02F 1/141* (2006.01)
*G02F 1/1337* (2006.01)

(52) U.S. Cl. ...................... 349/134; 349/123; 349/125; 349/130

(58) Field of Classification Search ................ 349/134, 349/123, 125, 130
See application file for complete search history.

(56) References Cited

U.S. PATENT DOCUMENTS

| | | | |
|---|---|---|---|
| 4,414,131 A * | 11/1983 | Sethofer et al. | 252/299.1 |
| 5,268,781 A * | 12/1993 | Shigeta et al. | 349/125 |
| 5,682,217 A | 10/1997 | Hisatake et al. | |
| 5,781,262 A | 7/1998 | Suzuki et al. | |
| 5,864,376 A | 1/1999 | Takatori | |
| 6,426,270 B1 * | 7/2002 | Sakaguchi et al. | 438/406 |
| 2002/0012088 A1 | 1/2002 | Ozawa et al. | |

FOREIGN PATENT DOCUMENTS

| | | |
|---|---|---|
| GB | 1583176 | 1/1981 |
| JP | 53-60254 | 5/1978 |
| JP | A 3-215831 | 9/1991 |
| JP | A 3-259116 | 11/1991 |
| JP | A 4-97228 | 3/1992 |
| JP | A 5-313126 | 11/1993 |
| JP | A 7-114028 | 5/1995 |
| JP | A 7-294932 | 11/1995 |

(Continued)

*Primary Examiner*—Mike Qi
(74) *Attorney, Agent, or Firm*—Oliff & Berridge, PLC

(57) ABSTRACT

To provide a liquid crystal device with a high contrast ratio without deteriorating the aperture ratios of the respective pixels by reducing inferior alignment in liquid crystal, which is caused by alignment films, a liquid crystal device includes an element substrate having active elements and pixel electrodes, a counter substrate arranged to face the element substrate and having counter electrodes that face the pixel electrodes, and a liquid crystal layer arranged between the element substrate and the counter substrate. On the internal surfaces of the element substrate and the counter substrate, the alignment films are made of column-shaped inorganic material structures inclined in a predetermined direction with respect to the surface of the substrates are provided. The liquid crystal is made of liquid crystal molecules having positive dielectric anisotropy. The pre-tilt angle $\theta 1$ of the liquid crystal molecules on the alignment film of the element substrate is no less than 10° and no more than 45° and the pre-tilt angle $\theta 2$ of the liquid crystal molecules on the alignment film of the counter substrate is no less than 0° and no more than 10°.

9 Claims, 10 Drawing Sheets

FOREIGN PATENT DOCUMENTS

| | | |
|---|---|---|
| JP | A 8-6028 | 1/1996 |
| JP | A-2001-166311 | 6/2001 |
| JP | A-2001-166312 | 6/2001 |
| JP | A-2001-166337 | 6/2001 |
| JP | A 2002-6321 | 1/2002 |
| JP | A-2002-049059 | 2/2002 |
| JP | 2002-116464 | 4/2002 |
| JP | A-2002-244135 | 8/2002 |
| JP | A-2002-296597 | 10/2002 |
| JP | 2003-005183 * | 1/2003 |
| JP | A 2003-005183 | 1/2003 |
| KR | A-1999-0075414 | 10/1999 |
| KR | A-2003-022691 | 3/2003 |

* cited by examiner (a)

|    | C1 | C2 | C3 | | | | | | |
|----|----|----|----|---|---|---|---|---|---|
| L1 | +  | +  | +  | + | + | + | + | + | + |
| L2 | -  | -  | -  | - | - | - | - | - | - |
| L3 | +  | +  | +  | + | + | + | + | + | + |
| L4 | -  | -  | -  | - | - | - | - | - | - |

(b)

|    | C1 | C2 | C3 | | | | | | |
|----|----|----|----|---|---|---|---|---|---|
| L1 | -  | -  | -  | - | - | - | - | - | - |
| L2 | +  | +  | +  | + | + | + | + | + | + |
| L3 | -  | -  | -  | - | - | - | - | - | - |
| L4 | +  | +  | +  | + | + | + | + | + | + |

|    | C1 | C2 | C3 | | | | | | |
|----|----|----|----|---|---|---|---|---|---|
| L1 | +  | +  | +  | + | + | + | + | + | + |
| L2 | +  | +  | +  | + | + | + | + | + | + |
| L3 | +  | +  | +  | + | + | + | + | + | + |
| L4 | +  | +  | +  | + | + | + | + | + | + |

(b)

|    | C1 | C2 | C3 | | | | | | |
|----|----|----|----|---|---|---|---|---|---|
| L1 | -  | -  | -  | - | - | - | - | - | - |
| L2 | -  | -  | -  | - | - | - | - | - | - |
| L3 | -  | -  | -  | - | - | - | - | - | - |
| L4 | -  | -  | -  | - | - | - | - | - | - |

115

LIQUID CRYSTAL DISPLAY DEVICE AND ELECTRONIC APPARATUS WHEREIN LIQUID CRYSTAL MOLECULES HAVING PARTICULAR PRE-TILT ANGLE

BACKGROUND OF THE INVENTION

1. Field of Invention

Exemplary aspects of the present invention relate to a liquid crystal display device and an electronic apparatus, and more particularly to the structure of a liquid crystal display device having pixel electrodes connected to active elements.

2. Description of Related Art

Generally, a related art liquid crystal display device has a structure in which liquid crystal is interposed between a pair of substrates. The initial alignment state of liquid crystal is determined and confined by the characteristics of the liquid crystal molecules and the characteristics of the alignment film formed on the surface of the substrate on the side of liquid crystal. An organic alignment film aligned in a predetermined direction, which is obtained by rubbing the surface of a polymer film, such as polyimide by cloth, is typically used as the alignment film.

SUMMARY OF THE INVENTION

However, the heat resistance and the light resistance of such a polymer film may deteriorate, and dust is commonly generated during a rubbing process to cause an inferior alignment. Further, when step differences exist on the surface of the substrate, portions in which the rubbing process is not performed, are easily generated to cause an inferior alignment which is less than desirable. Such an inferior alignment diminishes transmittance in white display or causes light leakage in black display to deteriorate the contrast of displayed images.

In particular, in the case of a TFT active matrix liquid crystal display device, since components, such as various wiring lines (scanning lines, data lines, and capacity lines) and TFTs for switching controlling pixel electrodes, are formed on a pixel substrate where a TFT array is formed, step differences are easily generated on the surface of the alignment film due to the complicated layer structure resulting from having such components. As a result, an inferior alignment film is formed on the element substrates, consequently decreasing the contrast of the liquid crystal display device.

The surface (for example, the region through which wiring lines pass) of the element substrate is planarized and a light shielding film is formed on a counter substrate or on the element substrate corresponding to the region formed with elements, on which the TFTs are formed such that the inferior alignment caused by the step differences does not affect display. For example see Japanese Unexamined Patent Application Publication No. 2001-166311 and Japanese Unexamined Patent Application Publication No. 2001-166312. Also, as described above, the surface of the element substrate is planarized and pattern films are formed so as to overlap under adjacent pixel electrodes, such that the edges of both pixel electrodes that face regions between pixels are high. The perpendicular electric field generated between the edges of the pixel electrodes and the counter substrate is stronger than the transverse electric field, such that it reduces the effects of the transverse electric field. For example, see Japanese Unexamined Patent Application Publication No. 2001-166337.

In such a liquid crystal display device, in view of preventing liquid crystal from deteriorating by direct current (DC), an inversion driving method of periodically inverting the polarity of the potential applied to each pixel electrode is adopted. Related art inversion driving methods include a frame inversion driving method of supplying potential of the same polarity to each pixel in one frame period and of inverting the polarity of the potential of each pixel every frame period, a "1H" inversion driving method (line inversion driving method) of inverting the polarity of the potential of each pixel every frame period and of alternately inverting the potential supplied to a pixel line in one frame period, and a "1S" inversion driving method (column inversion driving method) of alternately inverting the potential supplied to a pixel column in one frame period. In the frame inversion driving method, the life span of a liquid crystal material is prolonged. However, since flicker may be generated due to crosstalk between adjacent pixels to deteriorate the display quality, the "1H" inversion driving method or the "1S" inversion driving method is widely used.

In a related art active matrix liquid crystal display device, the enhancement of the aperture ratio of a pixel may be prevented by covering a region having large step differences, for example, a region formed with elements having a light shielding film. In particular, since pixel pitch is reduced in size in accordance with high precision required in a screen, it is difficult to make active elements small or wiring lines further minute such that the ratio of the light shielding area of the region formed with elements to the pixel area increases, to deteriorate the aperture ratio. Thus, the above-described measures to enhance inferior alignment, specifically, of shielding light, are becoming more difficult to implement.

When the above-described "1H" inversion driving method or the "1S" inversion driving method is adopted as a method of driving a liquid crystal display device, since potentials of reverse polarities are always applied between pixel lines or pixel columns in a frame, disclination of liquid crystal is caused by the transverse electric field generated between adjacent pixel electrodes, such that transmittance is diminished or light leakage is caused in this portion to deteriorate the contrast of displayed images. In order to address and/or solve the problem, the regions between the pixels may be covered by the light shielding film as described above. However, in this case, the aperture ratio cannot be maintained or enhanced as described above. Also, as described above, since the liquid crystal display device is highly precise with the pixel pitch reduced in size, such that the distance between adjacent pixel electrodes is reduced to increase the strength and the effects of the transverse electric field.

In order to address and/or solve the above and/or other problems, exemplary aspects of the present invention provide a high quality liquid crystal device having a high contrast ratio by reducing the inferior alignment in liquid crystal, which is caused by alignment films without deteriorating the aperture ratios of the respective pixels.

In order to achieve the above, there is provided a liquid crystal device including an element substrate having active elements and pixel electrodes electrically connected to each other, a counter substrate arranged to face the element substrate and having counter electrodes facing the pixel electrodes, and a liquid crystal layer arranged between the element substrate and the counter substrate. On internal surfaces of the element substrate and the counter substrate, alignment films made of an inorganic material in a column-shaped structure is arranged to be inclined in a predetermined direction with respect to the surfaces of the substrates. The liquid crystal layer is mainly made of liquid crystal molecules having positive dielectric anisotropy. A pre-tilt angle of the liquid crystal molecules on the alignment film of the element substrate is no less than 10° and no more than 45°. The pre-tilt angle of the liquid crystal molecules on the alignment film of the counter substrate is no less than 0° and no more than 10°.

According to this exemplary aspect of invention, since an alignment film formed of an inorganic material in a column-shaped structure is arranged to be inclined with respect to the surface of the substrate in a predetermined direction, it is possible to reduce the likelihood or prevent dust from being generated during the rubbing process, unlike in the case where the polymer alignment film is used and to thus reduce the inferior alignment caused by dust. Also, since it is possible to easily control the pre-tilt angle of the liquid crystal molecules of such an alignment film in accordance with conditions of forming the film (it is possible to easily increase the pre-tilt angle), it is possible to reduce the effects of the alignment distortion due to the transverse electric field to be described later. Such an alignment film can be formed by depositing an inorganic material, such as SiO on the substrate by an oblique deposition method. Since an alignment film is formed of SiO by arranging inclined column-shaped structures, it is possible to easily set the pre-tilt angle proper to a homogeneous alignment mode and to easily control the pre-tilt angle. The inclined column-shaped structure made of inorganic material can be formed by an anisotropic sputtering method, such as an ion beam sputter and a miller thoron sputter, as well as the above-described oblique deposition method.

Since a liquid crystal layer is formed of liquid crystal molecules having positive dielectric anisotropy according to the liquid crystal device of an exemplary aspect of the present invention, the longitudinal axis of the liquid crystal molecules is aligned to the direction of the perpendicular electric field due to the perpendicular electric field applied to the direction of the thickness of the liquid crystal layer. In such a homogeneous alignment mode, when the pre-tilt angle of the liquid crystal is too small, reversed tilt is easily generated during the application of perpendicular electric field, such that remarkable spots are caused by disclination to deteriorate the contrast ratio and to deteriorate the display characteristic, such as afterimage. When the pre-tilt angle becomes larger, the above problems are reduced. However, optical characteristics (such as light transmittance when white is displayed) when no voltage is applied deteriorate to deteriorate the contrast. Thus, the decrease or increase in the pre-tilt angle of liquid crystal leads to the deterioration of the contrast.

In the homogeneous alignment mode, the pre-tilt angle of the liquid crystal molecules in the alignment film of the element substrate may be no less than 10° and no more than 45°. When the pre-tilt angle is no less than 10°, it is difficult to be affected by the transverse electric field caused by adjacent pixel electrodes. This is because, when the pre-tilt angle is larger than a predetermined degree, the liquid crystal molecules are easily aligned along the perpendicular electric field when the perpendicular electric field is applied such that, even if the transverse electric field exists, it is difficult to be affected by the transverse electric field in the direction where the liquid crystal molecules are aligned. When the pre-tilt angle is larger than 45°, as described above, due to the deterioration of the optical characteristics when no voltage is applied, the contrast deteriorates.

The pre-tilt angle of liquid crystal on the alignment film of the counter substrate may be no less than 0° and no more than 10°. The pre-tilt angle of liquid crystal on the alignment film of the counter substrate can be made smaller than the pre-tilt angle of liquid crystal on the element substrate since it is not necessary to consider the influence of the transverse electric field of adjacent pixels. When the pre-tilt angle on the element substrate is large, it is possible to effectively reduce inferiority in the optical characteristics when no voltage is applied. However, when the pre-tilt angle is larger than 10°, the above-described advantage is removed.

In a second liquid crystal device according to an exemplary aspect of the present invention, the liquid crystal device includes an element substrate having active elements and pixel electrodes electrically connected to each other, a counter substrate arranged to face the element substrate and having counter electrodes facing the pixel electrodes, and a liquid crystal layer arranged between the element substrate and the counter substrate. On an internal surface of the element substrate, an alignment film made of an inorganic material in a column-shaped structure is arranged to be inclined in a predetermined direction with respect to the surface of the substrate. The liquid crystal is made of liquid crystal molecules having negative dielectric anisotropy. The pre-tilt angle of the liquid crystal molecules on the alignment film of the element substrate is no less than 85° and no more than 90°.

According to this exemplary aspect of the invention, since an alignment film formed of column-shaped inorganic structures inclined with respect to the surface of the substrate in a predetermined direction is used, it is possible to reduce the likelihood or prevent dust from being generated during the rubbing process, unlike in the case where the polymer alignment film is used, and to thus reduce the inferior alignment caused by dust. Also, since it is possible to easily control the pre-tilt angle of the liquid crystal molecules of such an alignment film in accordance with conditions of forming the film (it is possible to easily increase the pre-tilt angle), it is possible to reduce the effects of the alignment distortion due to the transverse electric field to be described later. Such an alignment film can be formed by depositing an inorganic material, such as $SiO_2$ on the substrate by an oblique deposition method. Since an alignment film is formed of $SiO_2$ by arranging inclined column-shaped structures, it is possible to easily set the pre-tilt angle proper to a vertical alignment mode and to easily control the pre-tilt angle. The inclined column-shaped structure made of inorganic material can be formed by an anisotropic sputtering method, such as an ion beam sputter and a miller thoron sputter as well as the above-described oblique deposition method.

When a liquid crystal layer of a vertical alignment mode using liquid crystal having negative dielectric anisotropy is included, when the pre-tilt angle is small, the longitudinal axis of the liquid crystal molecules is significantly inclined with respect to the vertical direction when no electric field is applied, such that optical modulation, such as optical activity or birefringence, occurs in the liquid crystal layer to cause light leakage of black display and to deteriorate the contrast. When the pre-tilt angle is large, the alignment restriction of the alignment film is small, such that the directions in which the liquid crystal molecules fall when an electric field is applied are not uniform to generate disclination. Specifically, in the vertical alignment mode, too much decrease and increase in the pre-tilt angle leads to the deterioration in the contrast.

In the vertical alignment mode, the pre-tilt angle of liquid crystal on the element substrate may be no less than 85° and no more than 90°. When the pre-tilt angle is less than 85°, when no electric field is applied, the degree of the optical modulation of the liquid crystal molecules, which is caused by optical anisotropy, increase such that the contrast is diminished. When the pre-tilt angle is no less than 90°, the contrast is diminished by the disclination at the time of applying the electric field. In particular, the disclination is caused by the fact that the longitudinal axis of the liquid crystal molecules is easily erected by the transverse electric field generated between adjacent pixels as well as the fact that the pre-tilt angle is large. In particular, the pre-tilt angle may be larger than 87° and smaller than 89°.

In any one of the above-described exemplary aspects of the invention, the surface under the alignment film in the element substrate may be planarized. It is possible to reduce or prevent the generation of inferior alignment in the alignment film, which is caused by the step differences on the uppermost surface of the substrate, by planarizing the step differences on the surface under the element substrate. In particular, when the alignment film is formed on the planarized surface under the alignment film using the oblique deposition method, it is possible to form a high quality alignment film in which there exists little difference in alignment restrictions. As the surface of the element substrate is planarized, the effects of the transverse electric field between adjacent pixels increase, such that the conditions of forming the pre-tilt angle of liquid crystal on the element substrate, are particularly effective.

In the planarizing process, in the structure where an insulating layer is formed under the pixel electrodes, the insulating layer is made of an inorganic insulating film, and the surface of the insulating layer is planarized by chemical and mechanical polishing, or the insulating layer is made of an organic polymer film, and the insulating layer is coated by spin coating to planarize the same. Also, a material to form electrodes may be planarized or a film may be formed on the electrodes to planarize the surface of the film. In the pixel regions including the regions in which the pixel electrodes and the counter electrodes overlap each other in plan view, due to the planarized surface under the alignment film, the amount of the step differences of the alignment film may be less than 1 μm and, in particular, preferably no more than 0.5 μm.

Any one of the above exemplary aspects of the invention may include a liquid crystal driving device driven by the frame inversion driving. When the polarities of the potentials supplied to adjacent pixel lines or adjacent pixel columns are reverse to each other, like in the "1H" inversion driving method or the "1S" inversion driving method, an abnormally large transverse electric field is generated between the pixel electrodes that belong to the adjacent pixel lines or the pixel columns, such that the contrast is diminished due to the disclination. In the frame inversion driving method, a small transverse electric field may be generated due to the on and off states or the gray scale display states of the respective pixels. However, a large transverse electric field caused by inversion driving is not generated. Thus, it is possible to enhance the contrast and to realize high quality images.

Furthermore, an electronic apparatus according to an exemplary aspect of the present invention has the several liquid crystal devices as display devices. The liquid crystal devices are not limited to display devices, although they may be mounted in an electronic apparatus as a display device. In particular, when the liquid crystal devices are used as projection display devices, such as liquid crystal projectors or transmissive display devices, such as portable electronic information terminals (such as mobile telephones), it is possible to effectively enhance the display quality of the liquid crystal devices.

BRIEF DESCRIPTION OF THE DRAWINGS

FIGS. 9(a) and 9(b) illustrate a "1H" inversion driving method;

FIGS. 10(a) and 10(b) illustrate a frame inversion driving method;

DETAILED DESCRIPTION OF PREFERRED EMBODIMENTS

Hereinafter, exemplary embodiments of the present invention will be described with reference to the drawings. The respective exemplary embodiments described hereinafter are obtained by applying the liquid crystal device according to an exemplary aspect of the present invention to a liquid crystal display device. The respective embodiments will be described with reference to the drawings. The contraction scales of each layer and member are different to make each layer and member recognizable in the figure.

First Exemplary Embodiment

Figure 1:
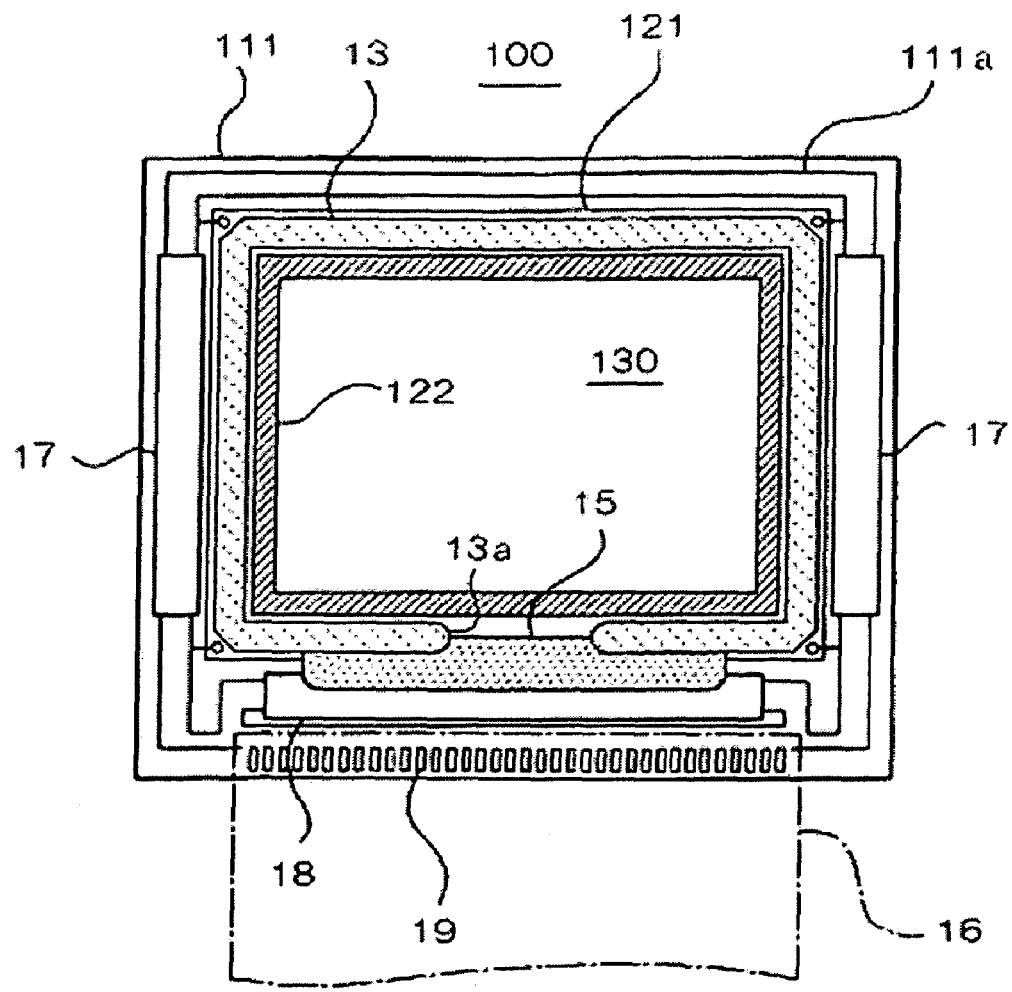
FIG. 1 is a schematic illustrating a panel structure according to a first exemplary embodiment of the present invention.
Figure 2:
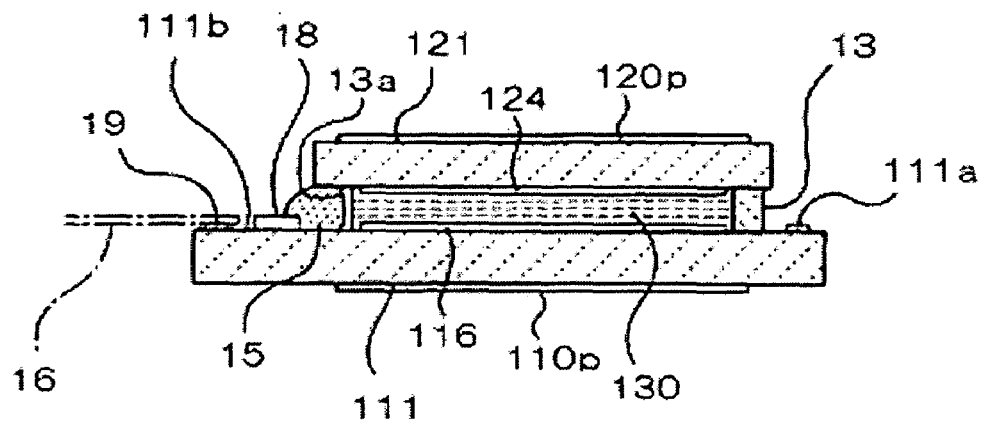
FIG. 2 is a schematic illustrating the panel structure according to the first exemplary embodiment of the present invention.

First, the schematic structure of a liquid crystal display device according to a first exemplary embodiment will now be described. FIG. 1 is a schematic of a panel structure of a liquid crystal device 100 according to the present exemplary embodiment. FIG. 2 is a cross-sectional schematic vertical of the same panel structure.

As illustrated in FIGS. 1 and 2, in the liquid crystal device 100, a substrate 111 and a substrate 121 made of glass or plastic are attached to each other to be separated from each other by a predetermined distance (a cell gap) by a sealing material 13. Liquid crystal 130 is arranged (sealed) in a liquid crystal arrangement region formed by the sealing material 13. The liquid crystal 130 is injected from a liquid crystal injection hole 13a provided in the sealing material 13. Then, the liquid crystal injection hole 13a is blocked by a blockade 15 made of resin. Photo-curable resin, such as epoxy resin and various kinds of resin can be used as the sealing material 13. In order to secure the cell gap (the distance between the substrates or the thickness of the liquid crystal layer), spacers (inorganic or organic fibers or spheres) having a particle diameter (of about 2 to 10 µm) corresponding to the cell gap may be mixed into the sealing material 13.

The substrate 111 has a surface area slightly larger than that of the substrate 112. Active elements, such as wiring line layers, transparent electrodes, thin film transistors (TFTs), and thin film diodes (TFDs) are formed on the internal surface in the liquid crystal arrangement region corresponding to a plurality of pixels. Wiring line layers corresponding to pixels and transparent electrodes are formed on the internal surface of the substrate 121. A light shielding film 122 is formed on the internal surface of the substrate 121 inside the region where the sealing material 13 is formed so as to surround a liquid crystal driving region in which pixels are arranged.

On the internal surface of the substrate 111, outside the region where the sealing material 13 is formed, a wiring line pattern 111a electrically connected to the wiring line layers formed on the internal surfaces of the substrates 111 and 121 is formed. Scanning line driving circuits 17 and a data line driving circuit 18 composed of integrated circuit chips in accordance with the wiring line pattern 111a are mounted. Furthermore, an external terminal unit 111b in which a plurality of external terminals 19 are arranged is provided at the outer edge on one side of the transparent substrate 111. A wiring line member 16, such as a flexible wiring line substrate, is electrically connected to the external terminal unit 111b via an anisotropic conductive film.

Liquid crystal 130 constitutes various modes of liquid crystal layers, such as twisted Nematic (TN) type or vertical alignment type in which, when an electric field is applied, the alignment of the liquid crystal molecules changes due to dielectric anisotropic. In accordance with this, optical states change due to optical anisotropy. In the liquid crystal device 100, a polarization film, a retardation film, an polarizer, etc. are mounted to face a predetermined direction in accordance with a kind of used liquid crystal 130, an operation mode, a display mode (normally white or normally black), etc. Also, in FIG. 2, only polarizers 110p and 120p arranged on the external surfaces of the substrates 111 and 121 are illustrated.

Figure 3:
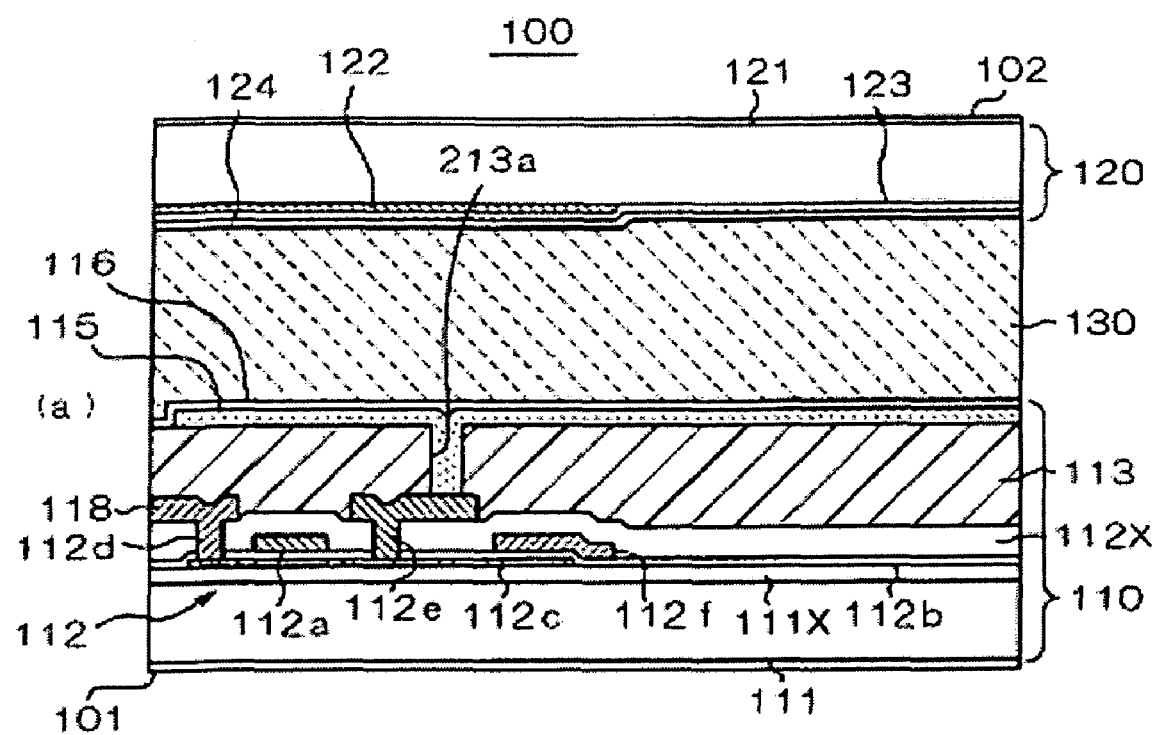
FIG. 3 is a schematic illustrating the enlarged panel structure according to the first exemplary embodiment.
Figure 4:
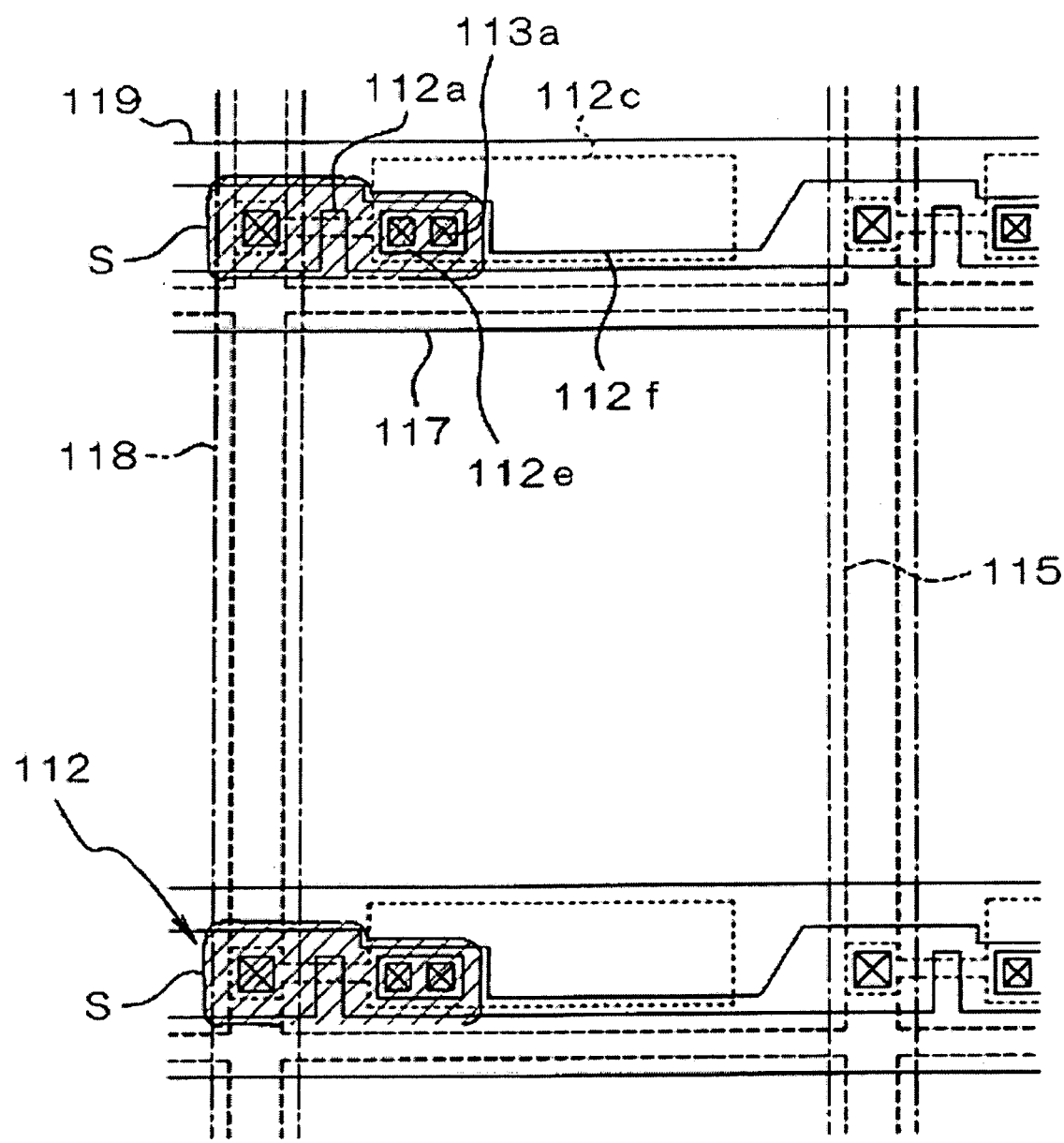
FIG. 4 is a schematic of an element substrate of the panel structure according to the first exemplary embodiment.

FIG. 3 is a schematic of an active matrix liquid crystal panel constructed using TFTs in the liquid crystal device 100. FIG. 4 is a schematic of an element substrate 110. As illustrated in FIG. 3, TFTs 112, pixel electrodes 115, etc. are formed on a substrate 111 of the element substrate 110. To be specific, a basic insulating film 111X is formed on the substrate 111 and the TFTs 112 are formed on the basic insulating film 111X. The TFTs 112 include gates 112a made of Ta and electrically connected to scanning lines 117 illustrated in FIG. 4, insulating thin films 112b made of $SiO_2$ and arranged under the gates 112a, and semiconductor layers 112c made of poly silicon and arranged to face the gates 112a with the insulating thin films 112b interposed. In the semiconductor layers 112c, the portions that face the gates 112a are channel regions. In the left half portions of the channel regions, source regions are formed to be connected to source electrodes 112d through an interlayer insulating film 112X. In the right half portions of the channel regions, drain regions are formed to be connected to drain electrodes 112e through the interlayer insulating film 112X.

As illustrated in FIG. 4, on the substrate 111, the scanning lines 117 and data lines 118 are vertically and horizontally formed to be parallel to each other, such that the scanning lines 117 are electrically connected to the gates 112a of the TFTs 112 formed in the pixels and that the data lines 118 are electrically connected to the source electrodes 112d of the TFTs 112. The drain electrodes 112e of the TFTs 112 are electrically connected to pixel electrodes 115 in an upper layer through openings 113a formed in insulating layers 113. Also, the drain regions of the semiconductor layers 112c are arranged to face storage electrodes 112f that are a part of capacitive lines 119 illustrated in FIG. 4 to constitute storage capacity among the capacitive lines 119.

The insulating layers 113 are made of synthetic resin, such as acryl resin, or an inorganic material, such as $SiO_2$. The insulating layers 113 are also formed on the TFTs 112. The surfaces of the insulating layers 113 are planarized. For example, when the insulating layers 113 are made of synthetic resin, the insulating layers 113 are coated with uncured resin and are planarized by a spin coating method. When the insulating layers 113 are made of an inorganic material, while supplying a chemical having a function of etching to the inorganic material, an abrasion pad is abutted on the insulating layers 113 and is rotated to chemically and mechanically abrade the insulating layers 113. Such planarizing processes are performed to reduce the amount of the step differences on the surfaces of the insulating layers 113 to no more than 1 µm and, preferably, no more than 0.5 µm. The material, of which electrodes are formed, may be planarized, or a film may be formed on the electrodes such that the surface of the film is planarized. The planarizing process may be performed on the regions that constitute the pixels, specifically, the regions (active areas) in which the pixel electrodes 115 and counter electrodes 123 to be described later overlap each other in plan view and is not necessarily performed on the peripheral regions of the active areas. Since the portions where the spaces among adjacent pixels are hollowed and the surfaces of the electrodes do not affect the formation of the alignment film, the hollow portions are not considered as step differences.

Figure 8:
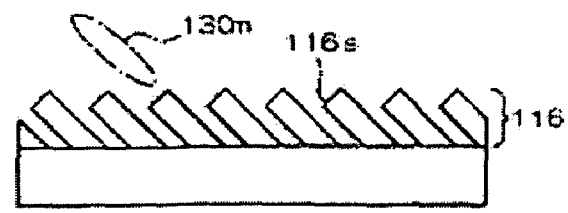
FIGS. 8(a), 8(b), 8(c), 8(d), and 8(e) are schematics illustrating the structures of alignment films.
Figure 8:
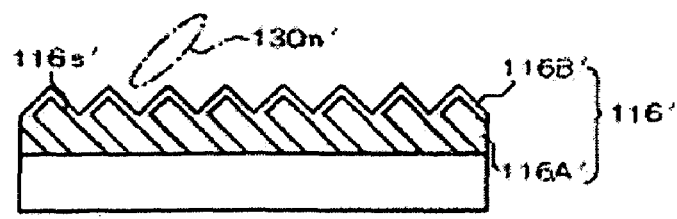
Figure 8:
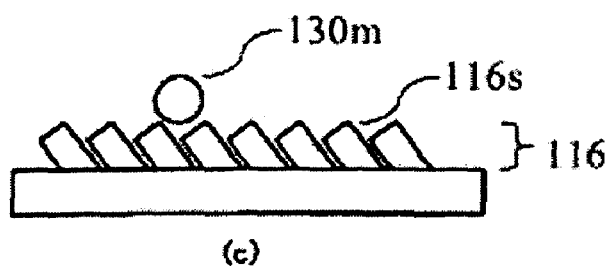
Figure 8:
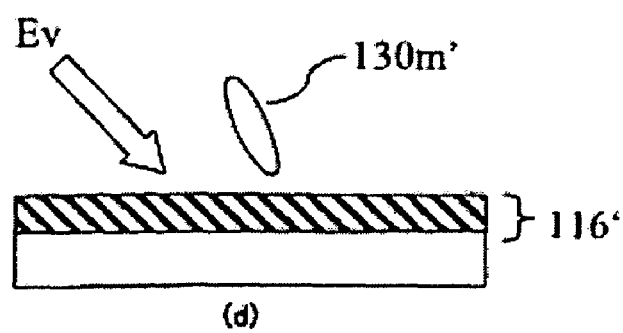
Figure 8:
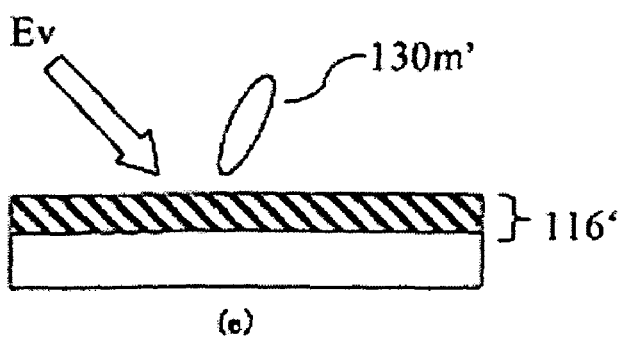

Next, the pixel electrodes 115 made of a transparent conductive substance, such as ITO, are formed on the insulating layers 113. Alignment films 116 are formed on the pixel electrodes 115. As illustrated in FIG. 8(a), the alignment films 116 are inorganic alignment films formed by arranging column-shaped structures 116s inclined with respect to the surface of the substrate 111 in a predetermined direction. In the surfaces of the alignment films 116, the amount of the step differences is no more than 1 µm, and, preferably no more than 0.5 µm when the flatness of the insulating layers 113 is reflected.

Figure 13:
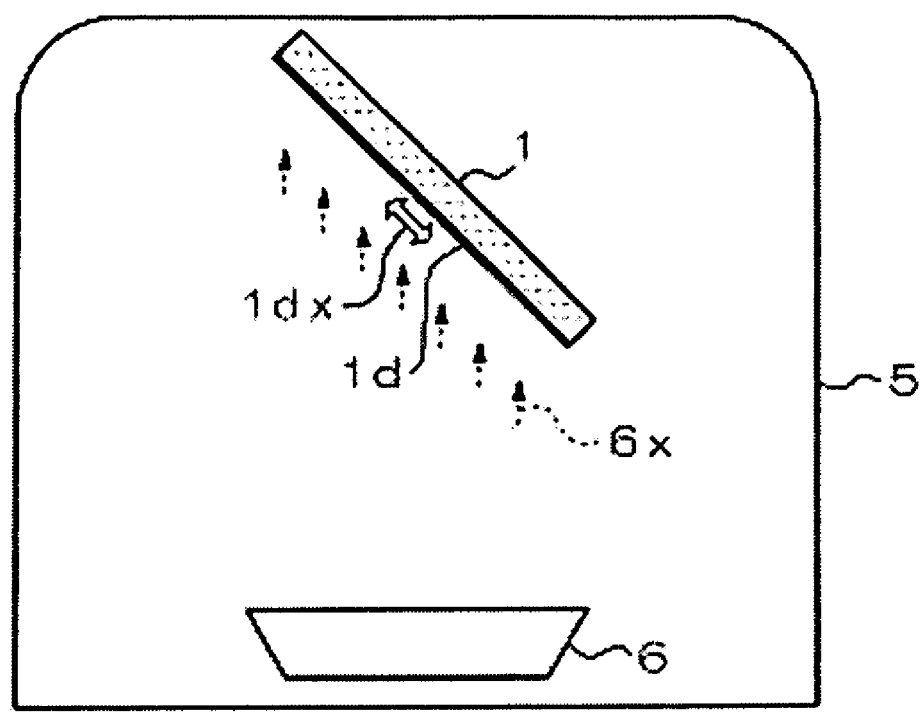
FIG. 13 is a schematic illustrating an oblique deposition method.

The alignment films 116 may be formed of an oblique deposition film by an oblique deposition method illustrated in FIG. 13. Specifically, the pressure inside a chamber 5 is reduced and an inorganic material is arranged in an evaporation source 6 and is heat to be evaporated. A substrate 1 is arranged in the chamber 5 to be inclined with respect to the evaporation source 6 such that the inorganic material is evaporated at a predetermined deposition angle with respect to the surface of the substrate. Here, 6x and 1dx denote the flying direction of the inorganic material and the inclination direction of the column-shaped aligned substances formed on the substrate 1, respectively. A deposition angle α is defined as an angle formed by the surface of the substrate 1 and the flying direction 6x of the inorganic material. The inorganic materials that constitute the alignment films 116 include SiO, $SiO_2$, SiN, MgO, $MgF_2$, $Al_2O_3$, and $TiO_2$.

When an alignment film is formed using such materials, a single material may be used, a multi-layer film made of different materials may be used in order to control electrical characteristics of liquid crystal, or different materials may be used for upper and lower substrates. According to the oblique deposition method, the deposition angle is about 5 to 45° with respect to the surface of the substrate. In the homogeneous alignment mode according to the present exemplary embodiment, the deposition angle is about 5 to 30°. In the vertical alignment mode according to a second exemplary embodiment to be described later, the deposition angle is about 30 to 45°. Since the relationship between the deposition angle and the pre-tilt angle is also dependent on the used material and the film thickness, it is not limited thereto.

The thickness of the alignment films 116 is about 50 to 2,000 Å. The film thickness is obtained when the concavo-convex structure of the alignment film illustrated in FIG. 8(a) is made even. Since the alignment restrictions of the alignment films 116 are significantly affected by the kinds of the inorganic materials and the deposition angle, the pre-tilt angle of liquid crystal on the alignment films 116 to be described later can be controlled by properly setting the inorganic material and the deposition angle of the alignment films 116.

In the counter substrate 120, counter electrodes 123 are formed on a substrate 121. To be specific, on the substrate 121, a light shielding film 122 is formed of metal, such as Cr and Al or black resin. The light shielding film 122 is formed at the outer edge of the liquid crystal driving region as illustrated in FIG. 1 and also formed so as to cover the regions between the respective pixels or the element-forming regions S in which the TFTs 112 are formed. Also, the counter electrodes 123 made of the transparent conductive substance, such as ITO are formed on the substrate 121. Alignment films 124 are formed on the counter electrodes 123.

The alignment films 124 are formed of inorganic alignment films by arranging column-shaped structures with respect to the surface of the substrate 121 in a predetermined oblique direction like the alignment films 116. The azimuth angle of the initial alignment of the liquid crystal 130 by the alignment films 124 is commonly different from the azimuth angle of the initial alignment of the liquid crystal 130 by the alignment films 116. For example, when the liquid crystal 130 constitutes a liquid crystal layer of a TN mode, the initial alignment azimuth angles of the liquid crystal molecules in the both alignment films are different from each other by about 90°.

The element substrate 110 and the counter substrate 120 are attached to each other via the sealing material 13 illustrated in FIGS. 1 and 2, so as to be separated from each other by a predetermined distance. At this time, spacers are arranged between the two substrates or inside the sealing material 13 to define the distance between the two substrates by the spacers. Then, a liquid crystal injection process to be described later is performed to form the panel structure illustrated in FIGS. 1 and 2.

Figure 5:
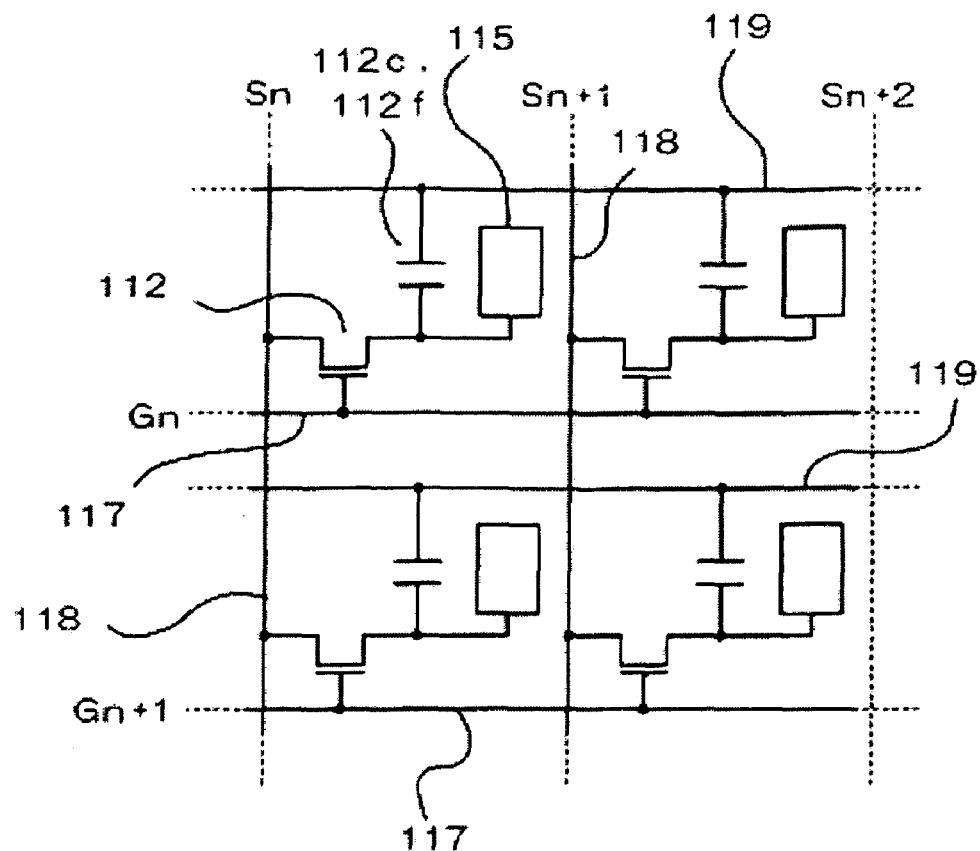
FIG. 5 is an equivalent circuit schematic of the element according to the first exemplary embodiment.

FIG. 5 is an equivalent circuit schematic illustrating an electrical structure of the element substrate 110 according to the present exemplary embodiment. The gates of the TFTs 112 are connected to the scanning lines 117. The sources of the TFTs 112 are connected to the data lines 118. The drains of the TFTs 112 are connected to the pixel electrodes 115. Potential supplied to the pixel electrodes 115 is held by the storage capacity constructed to be opposite to the drain regions of the semiconductor layers 112c and the storage electrodes 112f provided in the capacitive lines 119 to face each other.

When the liquid crystal device 100 is driven, image signals S1, S2, . . . , and Sn are supplied to the data lines 118. The image signals may be line-sequentially supplied to the data lines 118 in the order where the data lines 118 are arranged, and may be supplied to every group of data lines 118 adjacent to each other. Scanning signals G1, G2, . . . , and Gm are supplied to the scanning lines 117 at a predetermined timing in pulse. The scanning signals are line-sequentially applied to the scanning lines 117 in the order where the scanning lines 117 are arranged. The TFTs 112 that are switching elements are closed by the scanning signals for a predetermined period such that the image signals S1, S2, . . . , and Sn supplied from the data lines 118 in this period are written in the pixel electrodes 115 at a predetermined timing. The image signals S1, S2, . . . , and Sn of a predetermined level written in the pixel electrodes 115 generate a predetermined transverse electric field among the counter electrodes 124 formed on the counter substrate 120 to maintain the perpendicular electric field for a predetermined period. Here, liquid crystal is gray scale driven in response to the level of the potential of the image signals. Here, the storage capacity reduces the likelihood or prevents the image signals stored in the pixel electrodes 115 from leaking until the next writing timing.

Figure 6:
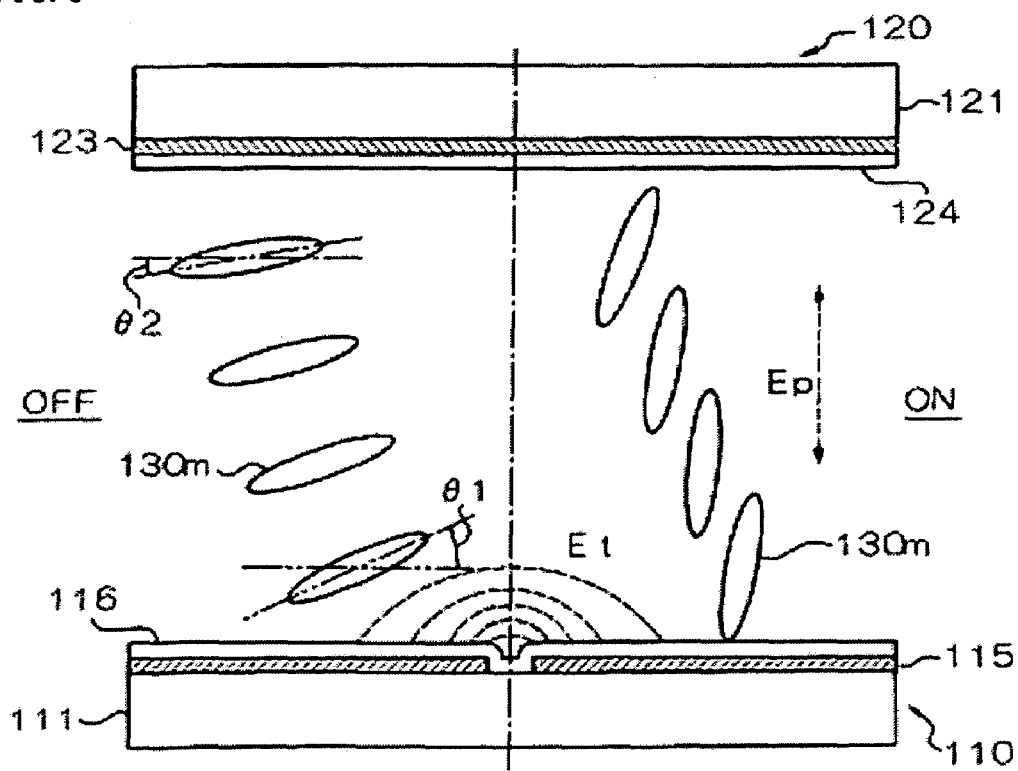
FIG. 6 is a schematic illustrating a liquid crystal cell structure according to the first exemplary embodiment.

FIG. 6 is a schematic illustrating the structure of a liquid crystal cell according to the present exemplary embodiment. Furthermore, according to the present exemplary embodiment, the liquid crystal layer in the TN mode is considered. However, in FIG. 6, the twisted state of the liquid crystal molecules is omitted. Here, the left half portion of FIG. 6 illustrates a state with no electric field applied and the right half portion of FIG. 6 illustrates a state with an electric field applied.

According to the present exemplary embodiment, in the state with no electric field applied, the pre-tilt angle $\theta 1$ of liquid crystal molecules 130m on the alignment film 116 provided in the element substrate 110 is no less than 10° and no more than 45°. Also, on the alignment film 124 provided in the counter substrate 120, the pre-tilt angle $\theta 2$ of the liquid crystal molecules 130m is no less than 0° and no more than 10°. According to the present exemplary embodiment, the pre-tilt angle $\theta 1$ is larger than the pre-tilt angle $\theta 2$.

According to the present exemplary embodiment, the pre-tilt angle $\theta 1$ of the liquid crystal molecules 130m in the alignment film 116 provided in the element substrate 110 is no less than 10°, which is relatively large. However, the pre-tilt angle $\theta 2$ of the liquid crystal molecules 130m in the alignment film 124 provided in the counter substrate 120 is less than 10°. Thus, in the state with no electric field applied, it is possible to reduce or prevent the optical modulation caused by the pre-tilt angle, that is, the optical activity and birefringence. Thus, it is possible to reduce or prevent transmittance from deteriorating (the white degree of white display from deteriorating) with no electric field applied in a normally white mode and to reduce or prevent light from leaking (the black degree of black display from deteriorating) with no electric field applied in a normally black mode.

With the electric field applied, the liquid crystal molecules 130m having positive dielectric anisotropy are aligned such that the molecular axis (the longitudinal axis) faces the vertical direction by the perpendicular electric field Ep applied between the pixel electrodes 115 and the counter electrodes 123. At this time, in the initial alignment state, since the pre-tilt angle $\theta 1$ of the liquid crystal molecules 130m in the alignment film 116 provided in the element substrate 110 is larger than the pre-tilt angle θ2 of the liquid crystal molecules 130m in the alignment film 124 provided in the counter substrate 120, the liquid crystal molecules 130m in the alignment film provided in the element substrate 110 more easily become vertical than the crystal molecules 130m in the alignment film provided in the counter substrate 120 to be close to vertical. Thus, it is possible to reduce the influence of a transverse electric field Et generated among the adjacent pixel electrodes 115 on the alignment of the liquid crystal molecules 130m. Specifically, around the element substrate 110, it is possible to reduce or prevent the disclination caused by the transverse electric field Et generated when an electric field is applied.

According to the present exemplary embodiment, when the pre-tilt angle is larger than 10°, it is possible to almost remove the influence of the transverse electric field Et. Since the pre-tilt angle θ2 is smaller than 10°, it is possible to reduce or prevent the contrast from deteriorating due to the size of the pre-tilt angle. When the pre-tilt angle θ1 is larger than 45°, the alignment restriction deteriorates such that the disclination is generated. As a result, it is difficult to reduce or prevent the contrast from deteriorating.

In order to confirm the effects of the first exemplary embodiment, the liquid crystal display panel having the liquid crystal layer in the TN mode having the above-described structure is manufactured. The alignment films 116 are formed of SiO as an inorganic material using the oblique deposition method illustrated in FIG. 13. The deposition angle is 3° to 10° (typically about 5°) such that the pre-tilt angle θ1 is about 20° to 30° (typically about 25°). In the alignment films 124, SiO is deposited in the same manner such that the deposition angle with respect to the surface of the substrate is about 25° to 30° (typically about 30°). As a result, as illustrated in FIG. 8(c), the liquid crystal molecules are arranged such that the azimuth angle is almost perpendicular to the deposition direction and the pre-tilt angle θ2 is 0° to 5° (typically about 0°). In this panel structure, transmittance in the white display is enhanced about 20%, compared with the case in which the pre-tilt angles θ1 and θ2 of the liquid crystal panel are 5°, and the other conditions are the same as described above.

When $Al_2O_3$ is used as an inorganic material, it is possible to obtain almost the same effect as the above-described effect.

The liquid crystal device 100 according to the present exemplary embodiment may be driven by the frame inversion driving method. According to the widely used related art 1 H inversion driving method, as illustrated in FIGS. 9(a) and 9(b), the polarities of the potentials applied to pixels 109 are inverted in a frame period. However, since the polarities of the potentials applied to the pixel electrodes 109 are alternately inverted in each frame period every pixel lines L1, L2, L3, ..., a large transverse electric field is always generated between pixel electrodes that belong to adjacent pixel lines. Although not shown, according to the "1S" inversion driving method, in each frame period, since the polarities of the potentials applied to the pixel electrodes are alternately inverted every pixel columns C1, C2, C3, ..., instead of the pixel lines L1, L2, L3, ..., a large transverse electric field is always generated between pixel electrodes that belong to adjacent pixel columns.

Thus, according to the frame inversion driving method according to the present exemplary embodiment, as illustrated in FIGS. 10(a) and 10(b), the potentials of the same polarity are supplied to the pixel electrodes 115 in one frame period such that the polarity of the supplied potentials is inverted every frame period. Thus, a transverse electric field between adjacent pixel electrodes is generated only when the on and off states of adjacent pixels are different from each other or when the gray scale control states of driving are different from each other, and the strength of the electric field is small. As described above, when the frame inversion driving method is adopted, a large transverse electric field is not always generated, unlike in the case where the "1H" inversion driving method or the "1S" inversion driving method is adopted, and it is possible to reduce the transverse electric field Et such that it is possible to reduce the influence of the disclination caused by the transverse electric field and to thus enhance the contrast. Also, since it is possible to reduce the range to be shielded from light by the light shielding film 122 in the regions among pixels, it is possible to form a panel structure having a higher aperture ratio.

Second Exemplary Embodiment

Figure 7:
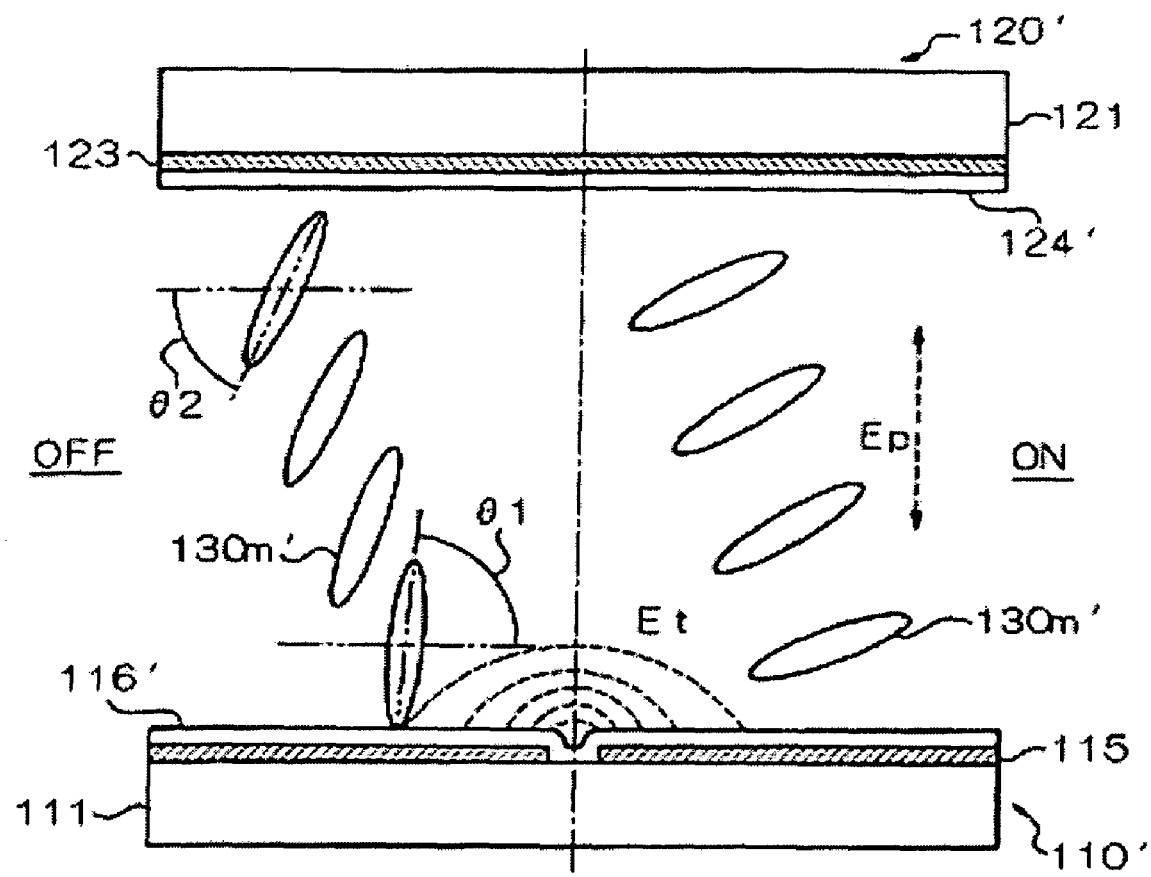
FIG. 7 is a schematic illustrating a liquid crystal cell structure according to a second exemplary embodiment.

Next, a second exemplary embodiment according to the present invention will be described with reference to FIG. 7. Since a liquid crystal device according to the exemplary embodiment has the basic structure and the driving method the same as those of the first exemplary embodiment illustrated in FIGS. 1 to 5, the same members as those of the first exemplary embodiment is attached by the same reference numerals and the description thereof will be omitted. The present exemplary embodiment is different from the first exemplary embodiment in view of alignment films 116', alignment films 124', and liquid crystal.

The alignment film 116' according to the present exemplary embodiment is formed of an inorganic alignment film illustrated in FIG. 8(d) or 8(e) obtained by arranging column-shaped structures 116s inclined in a predetermined direction by the same method as illustrated in the first exemplary embodiment. In this case, when the alignment film 116' is formed by the oblique deposition method, the deposition angle may be in the range of 30 to 45°. Dependent on the deposition angle, the deposition material, and the film thickness, there are a case where liquid crystal molecules 130m' are inclined in the deposition direction Ev as illustrated in FIG. 8(d), and a case where liquid crystal molecules 130m' are inclined in the direction opposite to the deposition direction Ev as illustrated in FIG. 8(e). The thickness of the alignment film 116' is about 50 to 2,000 Å. As illustrated in FIG. 8(b), after forming inorganic alignment layers 116A', column-shaped structures 116s' are coated with a vertical alignment agent 116B' made of a coupling agent having organic polymer and a long-chain alkyl group or alcohol. For example, the inorganic alignment agent 116B' includes octadecyltriethoxysilane and octadecanol. The materials of the alignment film 116' are as illustrated in the first exemplary embodiment. The alignment films 124' according to the present exemplary embodiment are formed by the same method as the alignment films 116'.

According to the present exemplary embodiment, liquid crystal is composed of liquid crystal molecules having negative dielectric anisotropy. As illustrated in the left half portion of FIG. 7, the liquid crystal molecules 130m' are initially aligned to an almost vertical direction due to the alignment films 116' and 124'.

The pre-tilt angle θ1 of the liquid crystal molecules 130m' on an element substrate 110' is in the range of no less than 85° and no more than 90° and, preferably, larger than 87° and smaller than 89°. When the pre-tilt angle θ1 is smaller than the range, optical modulation occurs with no electric field applied such that transmittance deteriorates (the white degree of white display deteriorates) in a normally white mode and light leakage occurs (the black degree of black display deteriorates) in a normally black mode, to deteriorate the contrast. When the pre-tilt angle θ1 is larger than the range, since it is not possible to control the directions in which the liquid crystal molecules 130m' fall when an electric field is applied, a reverse tilt domain is generated such that disclination is generated in liquid crystal to deteriorate the contrast. When the pre-tilt angle θ1 is larger than the range, since it is difficult for the liquid crystal molecules 130m' to fall when an electric field is applied, it is easily affected by the transverse electric field Et generated between adjacent pixel electrodes such that disclination of liquid crystal is easily generated.

The pre-tilt angle θ2 on the side of the counter substrate 120 may be in the range of no less than 80° and no more than 90°. The pre-tilt angle θ2 may be almost equal to the pre-tilt angle θ1 on the side of the element substrate 110.

According to the present exemplary embodiment, the alignment films 116' and 124' are formed using the inorganic material $SiO_2$ by the oblique deposition method at the deposition angle of 45°. In the panel structure, the pre-tilt angles θ1 and θ2 are about 88°. It is possible to obtain the structure illustrated in FIG. 8(d) in which the liquid crystal molecules are inclined in the deposition direction when the alignment film is formed. In the panel structure, the contrast ratio was enhanced about 40%, compared with another panel structure in which the pre-tilt angle θ1 is 90°, the pre-tilt angle θ2 is 84°, and the other conditions are the same as described above.

The alignment films 116' and 124' are formed using the inorganic material $SiO_2$ by the oblique deposition method at the deposition angle of 30°. In the panel structure, the pre-tilt angles θ1 and θ2 are about 87°. It is possible to obtain the structure illustrated in FIG. 8(d) in which the liquid crystal molecules are inclined in the direction opposite to the deposition direction where the alignment film is formed. In the panel structure, the contrast ratio improved about 35%, compared with another panel structure in which the pre-tilt angle θ1 is 90°, the pre-tilt angle θ2 is 84°, and the other conditions are the same as described above.

Third Exemplary Embodiment

Next, an electronic apparatus mounted with an electro-optical device according to a third exemplary embodiment of the present invention will be described with reference to FIGS. 11 and 12. According to the present exemplary embodiment, an electronic apparatus having the liquid crystal device 100 as display device will be described. An electro-optical device according to another exemplary embodiment can be applied to the present exemplary embodiment like the liquid crystal device 100.

Figure 11:
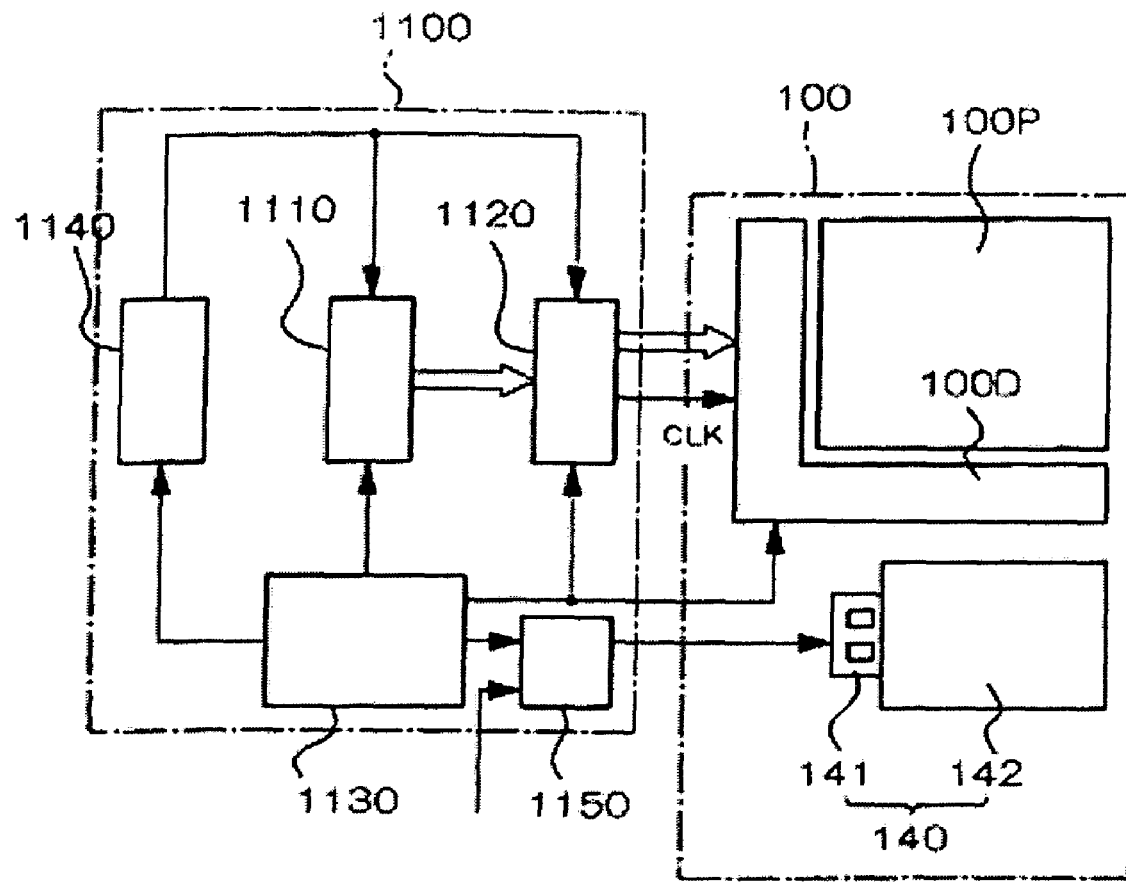
FIG. 11 is a schematic of an electronic apparatus.

FIG. 11 is a schematic illustrating the entire structure of a control system (display control system) of the liquid crystal display device 100 in the electronic apparatus according to the present exemplary embodiment. The electronic apparatus has a display control circuit 1100 that includes a display information output source 1110, a display information processing circuit 1120, a power source circuit 1130, a timing generator 1140, and a light source control circuit 1150. In the electro-optical device 100, a liquid crystal display panel 100P having the above-described structure and a driving circuit 100D to drive the liquid crystal display panel 100P. The driving circuit 100D may include electronic parts directly mounted in the liquid crystal display panel 100P (such as a semiconductor IC), a circuit pattern formed on the surface of a panel or a circuit pattern or a semiconductor IC chip mounted on a circuit substrate electrically connected to a liquid crystal panel. Further, the liquid crystal display device 100 has illumination device 140, such as a back light, arranged on the back of the liquid crystal display panel 100P.

The display information output source 1110 includes a memory, such as a read only memory (ROM) and a random access memory (RAM), a storage unit such as a magnetic recording disc and an optical recording disc, and a tuning circuit to synchronously output a digital image signal, and supplies display information to the display information processing circuit 1120 in the form of an image signal of a predetermined format based on various clock signals generated by the timing generator 1140.

The display information processing circuit 1120 includes related art circuits, such as a serial-parallel conversion circuit, an amplification and inversion circuit, a rotation circuit, a gamma correction circuit, and a clamp circuit, and processes input display information and supplies the image information to the driving circuit 100D together with a clock signal CLK. The driving circuit 100D includes a scanning line driving circuit, a signal line driving circuit, and an inspection circuit. The power source circuit 1130 supplies a predetermined voltage to the above-described components.

The light source control circuit 1150 supplies power supplied from the power source circuit 1130 to a light source unit 141 of the back light 140 based on a control signal introduced from the outside. The light emitted from the light source unit 141 is incident on a light guide plate 142 and is radiated onto the electro-optical panel 100P from the light guide plate 142. The light source control circuit 1150 controls the illumination and non-illumination of the respective light sources of the light source unit 141 in response to the control signal. Also, the light source control circuit 1150 may control the brightness of the respective light sources.

Figure 12:
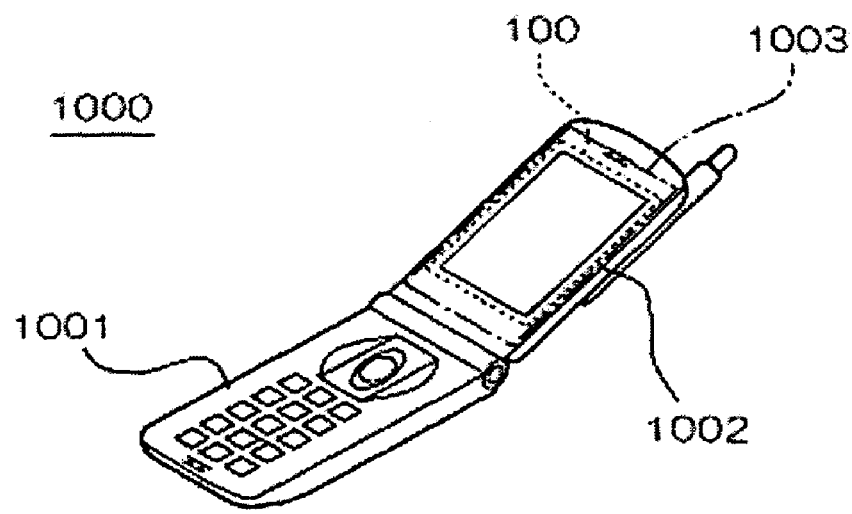
FIG. 12 is a schematic of the external appearance of an electronic apparatus.

FIG. 12 illustrates the external appearance of a mobile telephone according to an exemplary embodiment of an electronic apparatus according to an exemplary aspect of the present invention. An electronic apparatus 1000 includes an operating unit 1001 and a display unit 1002. A circuit substrate 1003 is arranged inside the case of the display unit 1002. The liquid crystal display device 100 is mounted on the circuit substrate 1003. The display screen of the liquid crystal panel 100P can be seen from the surface of the display unit 1002.

Fourth Exemplary Embodiment

Finally, as an example of another electronic apparatus using the liquid crystal device, an exemplary embodiment of a liquid crystal projector (a projection display device) will be described. For example, the liquid crystal device can be applied to a color liquid crystal projector (a projection display device). In such a case, three liquid crystal devices are used as RGB light valves, and light components of the respective colors decomposed by RGB color decomposing dichroic mirrors are incident on the light valves, respectively. Thus, according to the above exemplary embodiment, color filters are not provided on the counter substrate. However, the RGB color filters may be formed on the counter substrate together with a protection film in a predetermined region that faces the pixel electrodes, on which a second light shielding film 23 is not formed. By doing so, it is possible to apply the liquid crystal devices according to the various exemplary embodiments to color liquid crystal devices, such as direct-view-type or reflective-type color liquid crystal TVs other than liquid crystal projectors.

Figure 14:
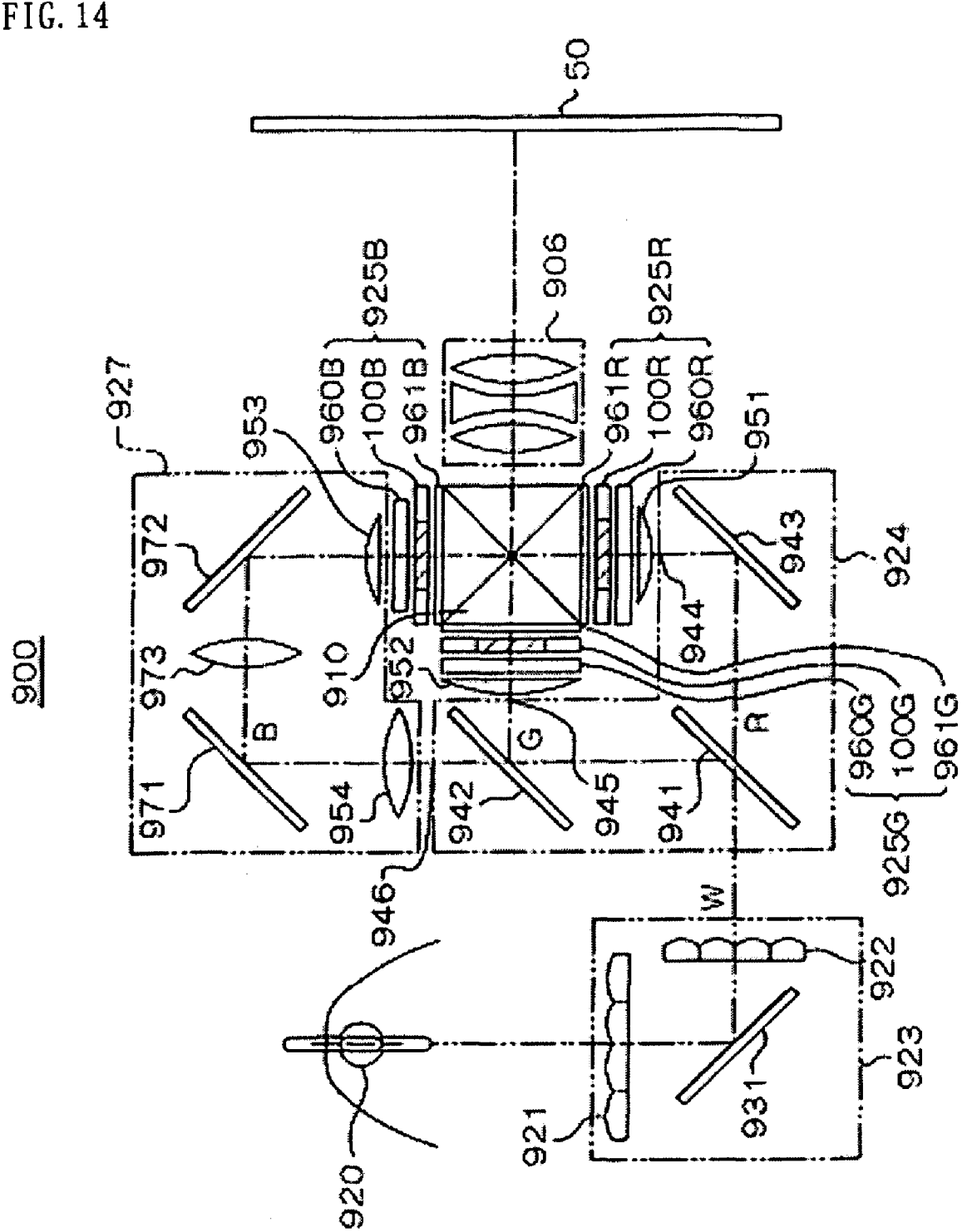
FIG. 14 is a schematic of a projection display device.

FIG. 14 is a schematic of an optical system of a projection display device 900. As illustrated in FIG. 14, the projection display device 900 includes the three liquid crystal devices used as liquid crystal devices 100R, 100G, and 100B for RGB, respectively. As the optical system of the projection display device according to the present exemplary embodiment, a light source 920 and an illumination optical system 923 are adopted. The projection display device includes a color dividing optical system 924 as a color dividing device to divide light beam W emitted from the uniform illumination optical system 923 into light beams of R, G, and B, three light valves 925R, 925G, and 925B as modulating device to modulate the respective color light beams R, G, and B, a color composing prism 910 as color composing device to re-compose the modulated color light beams, a projection lens unit 906 as a projection device to enlarge the composed light beams and projecting the same to the surface of a projection surface 50, and a light guiding system 927 to guide the blue light beam B to the corresponding light valve 925B.

The illumination optical system 923 includes two lens plates 921 and 922 and a reflection mirror 931. The two lens plates 921 and 922 are perpendicular to each other with the reflection mirror 931 interposed between the two lens plates 921 and 922. Each of the two lens plates 921 and 922 of the illumination optical system 923 includes a plurality of rectangular lenses arranged in a matrix. The light beams emitted from the light source 920 are divided into a plurality of partial light beams by the rectangular lenses of the first lens plate 921. The partial light beams overlap each other around the three light valves 925R, 925G, and 925B by the rectangular lenses of the second lens plate 922. Thus, by using the illumination optical system 923, even when non-uniform distribution of illuminance is shown on the section of the light emitted by the light source device 920, it is possible to illuminate the three light valves 925R, 925G, and 925B by uniform illumination light.

The color dividing optical system 924 includes a blue-green reflection dichroic mirror 941, a green reflection dichroic mirror 942, and a reflection mirror 943. First, the blue light beam B and the green light beam G included in the light beams W are reflected to the blue-green reflection dichroic mirror 941 at a right angle to travel to the side of the green reflection dichroic mirror 942. The red light beam R passes through the mirror 941, is reflected to a reflection mirror 943 in the hind portion at a right angle, and is emitted from an emitting unit 944 of the red light beam R to the color composing prism 910. An optical modulation film, such as polarizer and a retardation film is inserted in an arbitrary position on a light path if necessary.

Next, between the blue and green light beams B and G reflected by the blue-green reflection dichroic mirror 941, only the green light beam G is reflected by the green reflection dichroic mirror 942 at a right angle and is emitted from an emitting unit 945 of the green light beam G to the side of the color composing optical system. The blue light beam B that passes through the green reflection dichroic mirror 942 is emitted from an emitting unit 946 of the blue light beam B to the light guiding system 927. According to the present exemplary embodiment, the distances from the emitting unit of the light beams W of the illumination optical element to the emitting units 944, 945, and 946 of the respective light beams of the color dividing optical system 924 are the same.

Light-focusing lenses 951 and 952 are arranged on the emitting sides of the emitting units 944 and 945 of the red and green light beams R and G of the color dividing optical system 924. Thus, the red and green light beams R and G emitted from the respective emitting units are incident on the light-focusing lenses 951 and 952 and are made parallel.

The red and green light beams R and G made parallel are incident on the light valves 925R and 925G and are modulated. Image information corresponding to the respective color light beams is added to the red and green light beams R and G. That is, such a liquid crystal device is switching controlled by a driving device (not shown) in response to image information such that the respective color light beams that pass through the light valves are modulated. The blue light beam B is induced to the corresponding light valve 925B through the light guide system 927 to be modulated in accordance with image information. Furthermore, the light valves 925R, 925G, and 925B according to the present exemplary embodiment may include an incidence side polarizing device 960R, 960G, and 960B, an emitting side polarizing device 961R, 961G, and 961B, and liquid crystal devices 100R, 100G, and 100B arranged between the polarizing device 960R, 960G, and 960B and the emitting polarizing device 961R, 961G, and 961B.

The light guiding system 927 includes a light-focusing lens 954 arranged on the emitting side of the emitting unit 946 of the blue light beam B, an incidence side reflection mirror 971, an emitting side reflection mirror 972, an intermediate lens 973 arranged between the incidence side reflection mirror 971 and the emitting side reflection mirror 972, and a light-focusing lens 953 arranged in front of the light valve 925B. The blue light beam B emitted from the light-focusing lens 954 is induced to the liquid crystal device 100B through the light guiding system 927 and is modulated. Among the distances from the emitting unit of the light beams W to the respective liquid crystal devices 100R, 100G, and 100B, the distance from the emitting unit of the light beams W to the liquid crystal device 100B is the largest. Thus, the loss of amount of the blue light beam is the largest. However, it is possible to reduce or prevent the loss of the amount of light by interposing the light guiding system 927.

The respective color light beams R, G, and B modulated by the light valves 925R, 925G, and 925B are incident on the color composing prism 910 and are composed by the color composing prism 910. The light components composed by the color composing prism 910 are enlarged and are projected to the surface of the projection surface 50 in a predetermined position through the projection lens unit 906.

Any liquid crystal devices according to the respective exemplary embodiments can be used as the liquid crystal devices 100R, 100G, and 100B. It is possible to realize a projection display device having high display quality with no display inferiority and without deteriorating a contrast ratio by using the liquid crystal device according to the above-described embodiment.

What is claimed is:

1. A liquid crystal device, comprising:
   an element substrate having active elements and pixel electrodes electrically connected to each other;
   a counter substrate arranged so as to face the element substrate and having counter electrodes facing the pixel electrodes;
   a liquid crystal layer arranged between the element substrate and the counter substrate; and
   alignment films disposed on internal surfaces of the element substrate and the counter substrate, the alignment films being made of an inorganic material in column-shaped structures that are arranged to be inclined in a predetermined direction with respect to a surface of the substrates, the liquid crystal layer including liquid crystal molecules having positive dielectric anisotropy, and a pre-tilt angle of liquid crystal molecules on the alignment film of the element substrate that is different from a pre-tilt angle of liquid crystal molecules on the alignment film of the counter substrate, the pre-tilt angle of liquid crystal molecules of the element substrate being no less than 10° and no more than 45° and the pre-tilt angle of liquid crystal molecules on the alignment film of the counter substrate being no less than 0° and less than 10°.

2. The liquid crystal device according to claim 1, the alignment film being formed by an oblique deposition method.

3. The liquid crystal device according to claim 1, the alignment film being formed by an anisotropic sputter method.

4. The liquid crystal device according to claim 1, the materials to form the alignment films including at least one of SiO, SiO2, SiN, MgO, MgF2, Al2O3, and TiO2.

5. The liquid crystal device according to claim 1, the surface of the element substrate below the alignment film being planarized.

6. The liquid crystal device according to claim 5, the planarizing process being performed such that surface step differences of pixel regions including the regions in which the pixel electrodes overlap the counter electrodes in plan view being no more than 1 mm.

7. The liquid crystal device according to claim 1, further comprising:

a liquid crystal driving device to perform frame inversion driving.

8. An electronic apparatus, comprising:

the liquid crystal device according to claim 7 as a display device.

9. A liquid crystal device, comprising:

an element substrate having active elements and pixel electrodes electrically connected to each other;

a counter substrate arranged so as to face the element substrate and having counter electrodes facing the pixel electrodes; and a liquid crystal layer arranged between the element substrate and the counter substrate, on an internal surface of the element substrate, an alignment film made of an inorganic material in a column-shaped structure being arranged to be inclined in a predetermined direction with respect to a surface of the substrate, the liquid crystal layer including liquid crystal molecules having negative dielectric anisotropy, and a pre-tilt angle of the liquid crystal molecules on the alignment film of the element substrate being no less than 85° and less than 90°.

* * * * *